(12) United States Patent
Sawai et al.

(10) Patent No.: US 6,264,331 B1
(45) Date of Patent: Jul. 24, 2001

(54) IMAGE PROJECTOR

(75) Inventors: Yasumasa Sawai, Sakai; Shunta Takimoto, Nishinomiya, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/181,484

(22) Filed: Oct. 28, 1998

(30) Foreign Application Priority Data

Oct. 31, 1997 (JP) .................................................. 9-300847

(51) Int. Cl.[7] .................................................. G03B 21/00
(52) U.S. Cl. .................................................. 353/31
(58) Field of Search .................................. 349/5; 353/30, 353/31, 37, 98, DIG. 3, DIG. 4

(56) References Cited

U.S. PATENT DOCUMENTS

| | | | |
|---|---|---|---|
| 5,381,197 | * | 1/1995 | Yoshida et al. ........................ 353/98 |
| 5,473,393 | | 12/1995 | Manabe .................................. 353/38 |
| 5,577,826 | * | 11/1996 | Kasama et al. ........................ 353/31 |
| 5,634,704 | * | 6/1997 | Shikama et al. ........................ 353/31 |
| 5,729,331 | * | 3/1998 | Tanaka et al. ........................ 355/563 |
| 5,884,991 | * | 3/1999 | Levis et al. ........................... 353/121 |
| 5,917,561 | * | 6/1999 | Hatanaka .................................. 349/8 |

FOREIGN PATENT DOCUMENTS

| | | |
|---|---|---|
| 62-180343 | 8/1987 | (JP) . |
| 7-159722 | 6/1995 | (JP) . |
| 8-271854 | 10/1996 | (JP) . |

* cited by examiner

Primary Examiner—Safet Metjahic
Assistant Examiner—Etienne LeRoux
(74) Attorney, Agent, or Firm—Sidley Austin Brown & Wood

(57) ABSTRACT

An image projector has an optical integrator for splitting illuminating light into multiple light beams. The light beams are reflected by a reflecting member so as to pass through a first half of an effective light pass-through area of a projection optical system. An image synthesizing unit generates a projection image from the light beams, and the projection image passes through a second half of the effective light pass-through area of the projection optical system, so as to be projected onto a screen.

11 Claims, 8 Drawing Sheets

IMAGE PROJECTOR

FIELD OF THE INVENTION

The present invention pertains to an image projector that projects an enlarged optical image onto a screen, and more particularly, to a construction of its illuminating optical system.

BACKGROUND OF THE INVENTION

An image projector that forms an optical image (projection optical image) by driving light valves, irradiated by illuminating light, based on image signals, and projects an enlargement of this optical image onto a screen, is conventionally known as a means to display a large image.

Japanese Laid-Open Patent Application Sho 62-180343, for example, discloses a reflective image projector having a spectro-optical system comprising a dichroic mirror, a total reflection mirror, and three liquid crystal light valves that form optical images of R, G and B components behind the projection optical system. Illuminating light is led to the liquid crystal light valves from the projection optical system via the spectro-optical system and the reflection of the illuminating light off of the liquid crystal light valves (optical images) is projected onto a screen in front of the projection optical system via the spectro-optical system and the projection optical system. A plate-like total reflection mirror is located at the aperture position of the projection optical system such that the illuminating light from the light source, irradiated from a direction perpendicular to the optical axis of the projection optical system, will be totally reflected by the total reflection mirror so as to (i) pass through half of the effective light pass-through area of the aperture in a direction parallel to the optical axis of the projection optical system and (ii) irradiate the liquid crystal light valves.

Japanese Laid-Open Patent Application Hei 7-159722 discloses a reflective image projector in which a light path splitting surface is located on the path of the illuminating light from the light source, and the light beams, reflected off of the light valves into the illuminating light path and comprising optical images, are split by the light path splitting surface into light beams that run in a direction perpendicular to the illuminating light and are projected onto the screen via reflection. The light beams from the light source are divided into multiple secondary light sources by means of fly eye lenses and these light beams from the secondary light sources irradiate the panel surfaces of the light valves, in a parallel fashion, through a relay lens, such that the illuminance distribution on the panel surfaces is made uniform.

Japanese Laid-Open Patent Application Hei 8-271854 discloses a reflective image projector having (i) an image forming lens, a deflective beam splitter and a dichroic prism located in the path of the illuminating light from the light source; (ii) a liquid crystal light valve located on each of the three exit surfaces of the dichroic prism; and (iii) a projection optical system located on the side of the exit surface of the polarized beam splitter, which is perpendicular to the light path of the illuminating light, wherein a kaleidoscope is located between the light source and the image forming lens.

The image projector disclosed in the Japanese Laid-Open Patent Application Sho 62-180343 converges the illuminating light from the light source to the aperture position of the projection optical system by means of a relay lens and reflects the secondary light source images toward the liquid crystal light valves by means of a total reflection mirror. Consequently, it is difficult to make the illuminance distribution on the liquid crystal light valve panel surfaces sufficiently uniform and to reduce the unevenness in the brightness of the projected image.

The image projector disclosed in Japanese Laid-Open Patent Application Hei 7-159722 splits the light source into multiple secondary light sources using multiple fly eye lenses in order to make the illuminance distribution on the light valve panel surfaces uniform. However, since it has a construction in which the multiple fly eye lenses are placed in a step configuration, the construction of the fly eye lenses is complex and is disadvantageous in terms of cost as well.

The image projector disclosed in the Japanese Laid-Open Patent Application Hei 8-271854 has a construction wherein the light source and the liquid crystal light valves are arranged linearly, and the illuminating light and the projection light are separated by means of a polarized beam splitter located on the path of the illuminating light from the light source. Consequently, the projection optical system increases in size, making it difficult to make the image projector compact.

The present invention was conceived in view of these problems. It provides an image projector having a compact construction, in which the illuminance distribution on the light valve panel surfaces is made uniform and the unevenness in the brightness of the projected image is reduced.

SUMMARY OF THE INVENTION

The present invention is an image projector having light valves that spatially modulate the illuminating light based on image signals and form optical images for projection; a light source means, which generates the illuminating light; a projection optical system, which is located between the light valves and the screen and projects the optical images onto the screen; and a reflecting member which is located at the projection optical system aperture position and reflects the illuminating light from the light source means such that the light strikes the light valves after passing through half of the effective light pass-through area of the aperture. The image projector has an optical integrator, which is located between the light source means and the reflecting member and splits the light beams from the light source means into multiple secondary light sources, in order to form multiple light source images at the projection optical system aperture position.

Using the construction described above, the illuminating light beams from the light source means are split into multiple secondary light sources, by means of an optical integrator, and strike the reflecting member. The light beams from the multiple secondary light sources are reflected by the reflecting member in a direction along the optical axis of the projection optical system and are formed into images at the aperture position of the projection optical system. The light beams from the multiple secondary light sources, which are formed into images at the aperture position, pass through the projection optical system, parallel to its optical axis, strike the light valves, and illuminate its panel surfaces with uniform illuminance. The illuminating light is spatially modulated by the light valves and optical images for projection (projection images) are formed. The light beams comprising the optical images are reflected from the light valves to the projection optical system. They then pass through the area of the aperture through which the illuminating light does not pass and are projected onto the screen in enlargement.

The present invention is also an image projector as described above, wherein the optical integrator comprises a first lens array and a second lens array, and the optical axes of at least some of the lens cells comprising the first lens array are decentered such that they are closer to the center of the array.

Using the construction described above, the illuminating light beams, emitted from the light source means, are split into multiple secondary light sources by means of the first lens array and are formed into images at the position of the second lens array. Since the optical axes of some of the lens cells of the first lens array are decentered toward the center of the array, the multiple secondary light sources formed by the first lens array become distributed such that they converge on the second lens array around its center. The light beams from the multiple secondary light sources, formed by the second lens array, are reflected by the reflecting member in a direction along the optical axis of the projection optical system, and are formed into images at its aperture position. Since the secondary light sources, formed by the second lens array, gather around the center of the array, the secondary light source images formed at the aperture position are distributed within the effective light pass-through area of the aperture, so that the illuminating light from the light source means is effectively used and illuminates the light valves.

The present invention is also an image projector, as described above, wherein the optical integrator comprises a first lens array and a second lens array, and the light source means comprises (i) a reflective mirror, a part of the reflective surface of which comprises a first rotatable quadric surface and the remainder of the reflective surface of which comprises a second rotatable quadric surface having the same focal point as the first rotatable quadric surface but a focal length different from that of the first rotatable quadric surface, and (ii) a light source located at the focal point of said reflective mirror.

Using the construction described above, some of the light beams emitted from the light source strike the first lens array directly via the opening of the reflective mirror, the remaining light beams are reflected by the reflective surface of the reflective mirror in a direction parallel to the rotational axis, and the reflected light strikes the first lens array through the opening of the reflective mirror. Since the reflective surface comprises two rotatable quadric surfaces having different curvatures, the opening has the configuration of a combination of two different types of fan-shaped areas having different radiuses. For example, the opening has a configuration similar to the shape of a Japanese drum, in which fan-shaped areas having a long radius are oriented vertically with one on top of the other such that they are symmetrical across a line, and fan-shaped areas having a short radius are horizontally oriented side by side such that they are symmetrical across a line.

Therefore, illuminating light beams having a vertically long illumination range, which appears similar to a Japanese drum, strike the first lens array and these light beams are split into multiple secondary light sources. The multiple secondary light sources formed by the first and second lens arrays are reflected by the reflecting member and are formed into images in the effective light pass-through area of the aperture (the semi-circular area). Since the distribution of the secondary light sources is vertically shorter than the configuration of the illuminating light striking the first lens array, most of the light beams are formed into images in the effective light pass-through area of the aperture, so that the illuminating light is effectively used.

The present invention is also an image projector, wherein the optical integrator comprises a first lens array and a second lens array, and the light source means comprises (i) a reflective mirror comprising (a) a paraboloid mirror and (b) a flat mirror located such that it covers half of the opening of the paraboloid mirror, and which directly reflects back the light, reflected off the paraboloid mirror, to the original reflection point on the paraboloid mirror, and (ii) a light source located at the focal point of the paraboloid mirror.

Using the construction described above, half of the light beams irradiated from the light source are reflected in a direction parallel to the rotational axis by means of the reflective surface of the paraboloid mirror, and directly strike the first lens array through the opening of the reflective mirror. The remaining half of the light beams are reflected in a direction parallel to the rotational axis by means of the reflective surface of the paraboloid mirror, and the reflected light is directly reflected back by the flat mirror located at the opening of the paraboloid mirror. The directly reflected light beams pass through the focal point of the paraboloid mirror and strike the first lens array after being reflected in a direction parallel to the rotational axis by the reflective surface facing the opening. Since half of the opening of the reflective mirror is covered by the flat mirror, it has a semi-circular configuration.

Therefore, illuminating light beams having a semi-circular illumination range strike the first lens array, and these light beams are split into multiple secondary light sources. The multiple secondary light sources formed by the first and second lens arrays are reflected by the reflecting member and are formed into images in the effective light pass-through area of the aperture (semi-circular area). Since the secondary light sources are distributed in a range vertically shorter than the configuration of the illuminating light that strikes the first lens array, most of the light beams are formed into images in the effective light pass-through area of the aperture, so that the illuminating light is effectively used.

In the image projector described above, it is preferable for the reflecting member to be located in the area closer to the light valves relative to the projection optical system aperture position.

Using the construction described above, by having the front lens unit optical system located in front of the projection optical system aperture close to the aperture position, the projection optical system can be made shorter along the optical axis and the lens diameters can be reduced, thus making it possible to make the entire projection optical system compact.

DETAILED DESCRIPTION OF THE INVENTION

Figure 1:
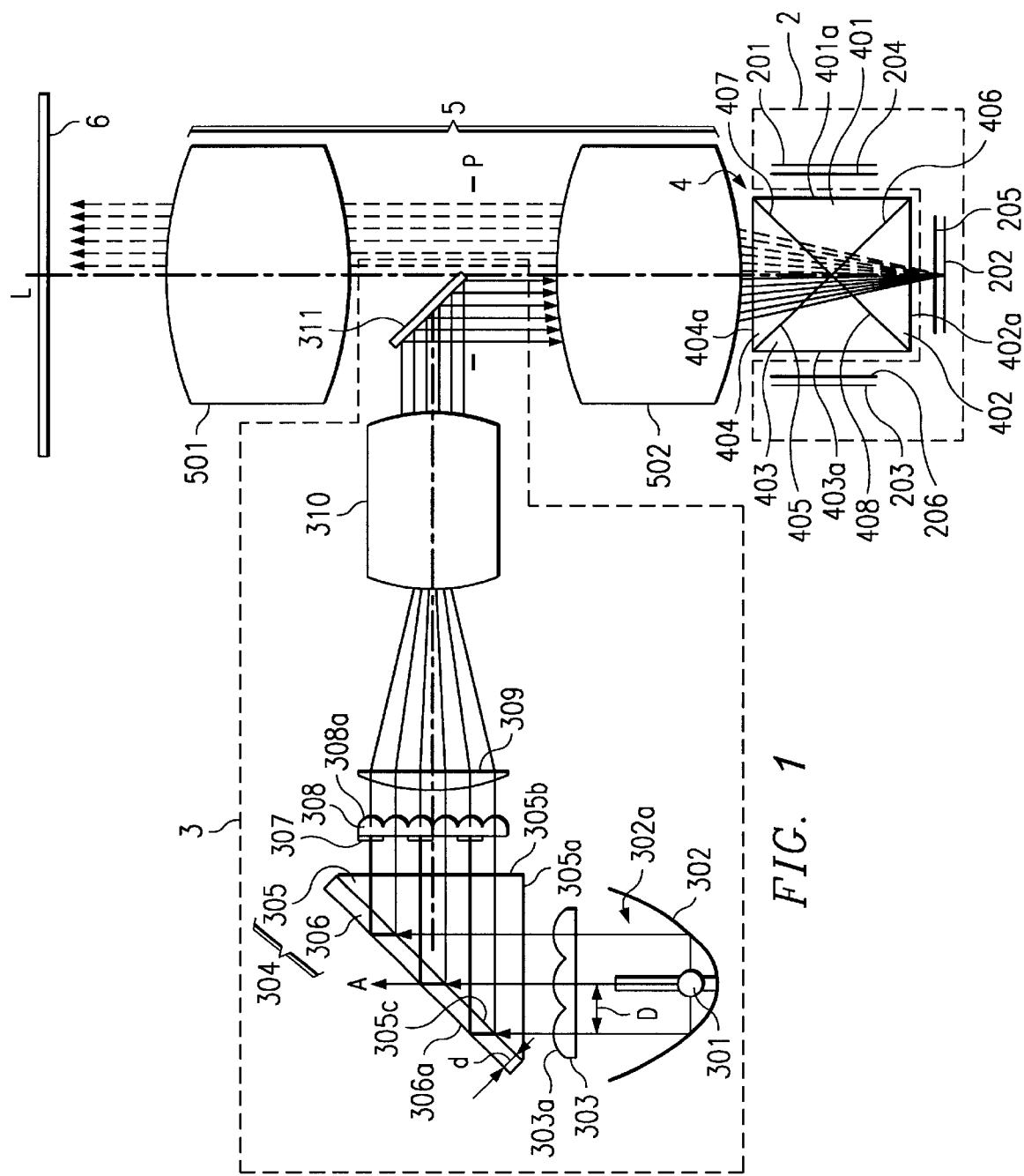
FIG. 1 is a diagram of a first embodiment of optical systems of an image projector of the present invention.

FIG. 1 shows a first embodiment of optical systems of an image projector of the present invention. In FIG. 1, the light beams indicated by solid lines represent the illuminating light, while the light beams indicated by dotted lines represent the projection light.

The image projector 1 comprises (i) an optical image forming unit 2 that converts the projected images, comprising image signals, into optical images (spectral images of the three primary colors, i.e., R, G and B); (ii) an illuminating optical system 3 that generates illuminating light, which illuminates the optical image forming unit 2, in order to generate optical images; (iii) an optical image synthesizing unit 4 which separates the illuminating light from the illuminating optical system 3 into light components of the three primary colors of R, G and B and irradiates them onto the optical image forming unit 2, and that synthesizes the optical images of the three colors, formed through the irradiation of the illuminating light, to generate a projection image; and (iv) a projection optical system 5 that projects the projection image; generated by the optical image synthesizing unit 4; onto a screen 6.

The optical image forming unit 2 comprises three reflective liquid crystal light valves (hereinafter simply "light valves") 201, 202 and 203 as well as deflecting plates 204, 205 and 206. The light valves 201, 202 and 203 convert the projected images, comprising electronic images for the colors R, G and B, into optical images. The polarizer plates 204, 205 and 206 are polarizer plates equipped with polarization characteristics that let an amount S of polarized light pass.

The illuminating optical system 3 comprises a light source 301, a reflector 302, a first lens array 303, a polarized separating prism 304, half-wave plates 307, a second lens array 308, a converging lens 309, a relay optical system 310, and a total reflection mirror 311. The first lens array 303, the polarized separating prism 304, the half-wave plates 307, and the second lens array 308 comprise an optical integrator, as described below.

Figure 2:
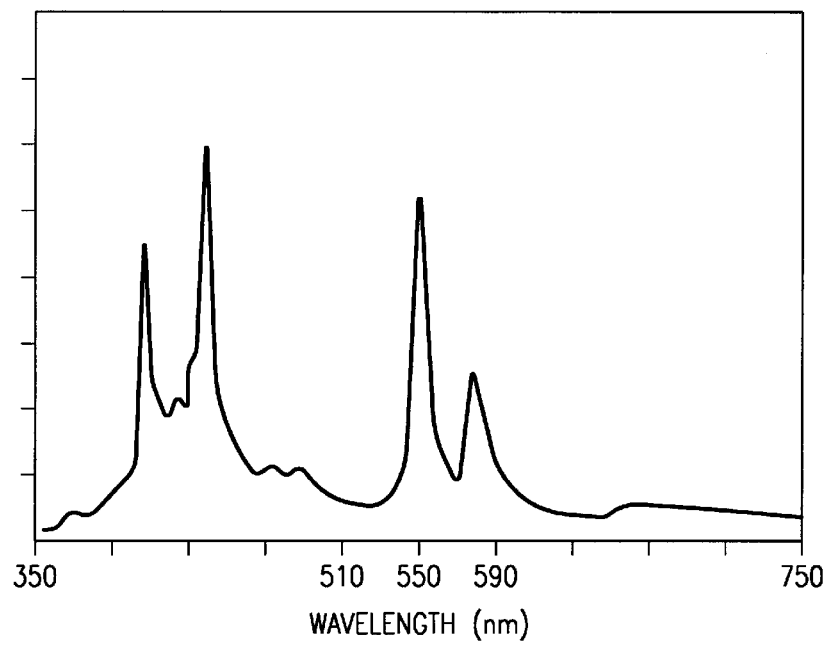
FIG. 2 is a graphical diagram of one example of illuminating light emission spectrum characteristics.

The light source 301 comprises a metal halide lamp, for example, and emits white light (randomly polarized light) having, for example, the emission spectrum characteristics shown in FIG. 2. A halogen lamp or xenon lamp is also acceptable as the light source 301. The reflector 302 directs the emitted light from the light source 301 in one direction and comprises a paraboloid mirror having a rotational quadric reflective surface. The light source 301 is located at the focal point of the reflector 302, and the light irradiated from the light source 301, toward the reflective surface of the reflector 302, is reflected by the reflective surface in a direction along the axis of the rotatable paraboloid mirror (the direction of arrow A in FIG. 1) and exits through the opening 302a.

Figure 3:
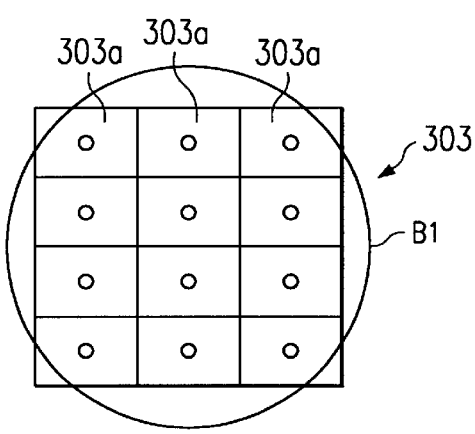
FIG. 3 is a diagram of the relationship between an effective diameter of illuminating light from a reflector and an alignment of lens cells of a first lens array.

The first lens array 303 comprises lens cells 303a comprising multiple plano-convex lenses aligned in a matrix (3×4 in this embodiment). It splits the light beams, entering from the light source 301 and the reflector 302, into multiple light beams and creates secondary light sources. In FIG. 3, the circle B1 shows the effective diameter of the light beams irradiated from the opening 302a of the reflector 302, while the blocks aligned in a matrix inside the circle B1 show the alignment of the lens cells 303a of the first lens array 303. The light beams entering the first lens array 303 are split by the lens cells 303a and create secondary light sources on the optical axes of the lens cells 303a (the black spots in FIG. 3).

The first lens array 303 is located at a position so as to have a conjugate relationship with the light valves 201, 202 and 203, through the optical effects of the second lens array 308, converging lens 309, relay optical system 310 and the rear lens unit 502 of the projection optical system 5 described below.

The polarized separating prism 304 splits the light beams that enter it from the lens cells 303a of the first lens array 303 into S polarized light beams and P polarized light beams, and outputs them. The polarized separating prism 304 comprises a rectangular prism 305 and a parallel flat panel 306 comprising clear glass glued to the angled surface 305c (hereinafter referred to as "polarized separating surface 305c") of the rectangular prism 305. It is located such that one transmitting surface 305a (hereinafter referred to as "entry surface 305a") is perpendicular to the optical axis of the first lens array 303 (an axis running in the direction of arrow A).

The S deflected light beams that enter the rectangular prism 305 from the lens cells 303a of the first lens array 303 through the entry surface 305a are reflected at a right angle by the polarized separating surface 305c of the rectangular prism 305 and exit the prism through its other transmitting surface 305b (hereinafter referred to as "exit surface 305b"). On the other hand, the P polarized light beams (shown in boldface in the drawing) pass through the polarized separating surface 305c of the rectangular prism 305, and are reflected at a right angle by the total reflection surface 306a of the parallel flat panel 306. They then pass through the polarized separating surface 305c of the rectangular prism 305 and exit through the exit surface 305b.

If the thickness of the parallel flat panel 306 is d, the P polarized light beam is reflected at a point which is offset by 2×d from the point at which the S polarized light beam is reflected. Therefore, the point at which the P polarized light beam exits through the exit surface 305b is offset by 2×d from the point at which the S polarized light beam exits it, in the direction parallel to the axis of the reflector 302. The light beams that exit the lens cells 303a of the first lens array 303 are split into S polarized light beams and P polarized light beams, which are offset from each other by 2×d by means of the polarized separating prism 304. Consequently, S polarized light beams and P polarized light beams alternately exit from the exit surface 305b of the polarized separating prism 304 in the direction parallel to the axis of the reflector 302.

The difference in position between an S polarized light beam and a P polarized light beam which are separated from the same light beam is 2×d, where the thickness of the parallel flat panel 306 is d. The S polarized light beam and P polarized light beam which are separated from a neighboring light beam is (D−2×d) if the distance between the optical axes of lens cells 303a of the first lens array 303 is D. In this embodiment, because S polarized light beams and P polarized light beams are uniformly distributed and are made into secondary light sources, the thickness of the parallel flat panel 306 is set such that (D−2×d)=2×d results. In other words, d=D/(4) holds true.

The second lens array 308 is located at a position so as to have a conjugate relationship with the light source 301 by means of the optical effects of the first lens array 303 and the polarized separating prism 304. The second lens array 308 has the same construction as the first lens array 303, but since lens cells 308a correspond to each of the S polarized light components and P polarized light components, the density of the lens cells is twice that of those in the first lens array 303 in the horizontal direction in FIG. 3.

The half-wave plates 307 convert the P polarized, light beams that enter the second lens array 308 into S polarized light beams. As a result, the half-wave plates 307 are located on the entry surfaces of the lens cells 308a of the second lens array 308 which correspond to the P polarized light beams. The S polarized light beams, which strike from the polarized separating prism 304, enter the second lens array 308 without being converted, while the P polarized light beams are converted into S polarized light beams by the half-wave plates 307 and enter the second lens array 308. After they are formed into second try light sources, they exit the second lens array 308.

Therefore, only S polarized light beams exit from the lens cells 308a of the second lens array 308. It is also acceptable if the half-wave plates 307 are located on the entry surfaces of the lens cells 308a of the second lens array 308 which correspond to the S polarized light beams, making the second lens array 308 secondary light sources of P polarized light beams. However, since having S polarized light beams as the secondary light sources has the effect of compensating for the difference between the light paths of the two polarized light beams generated by means of the polarized separating prism 304, it is preferred that the P polarized light beams be converted into S polarized light beams.

The converging lens 309 overlays the illuminating light from the secondary light sources such that uniform illuminance may be obtained. The relay optical system 310 forms images of the secondary light sources at the aperture position P of the projection optical system 5. In other words, the second lens array 308 and the aperture position of the projection optical system 5 are set such that they are in a conjugate relationship by means of the optical effects of the converging lens 309, the relay optical system 310, and the total reflection mirror 311. The total reflection mirror 311 is located near the aperture position P of the projection optical system 5. It reflects the illuminating light which has passed through the relay optical system 310 and leads it to the optical image forming unit 2 through half of the effective light pass-through area of the aperture of the projection optical system 5 (the left half area in FIG. 1).

Figure 4:
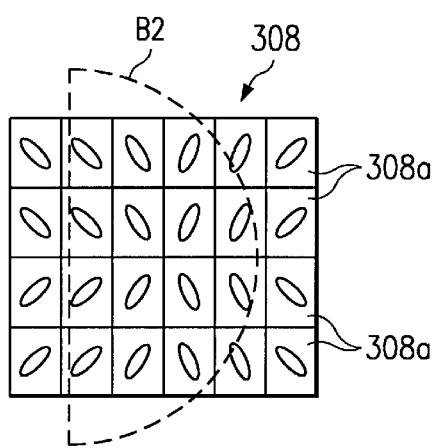
FIG. 4 is a diagram of the relationship between multiple secondary light sources formed by a second lens array and an aperture's effective illuminating light pass-through area.

Since the secondary light sources on the second lens array 308 are formed into images in the half part of the aperture of the projection optical system 5, the relationship between the secondary light sources, formed on the second lens array 308, and the effective area of the aperture of the projection optical system 5 is as shown in FIG. 4.

Figure 5:
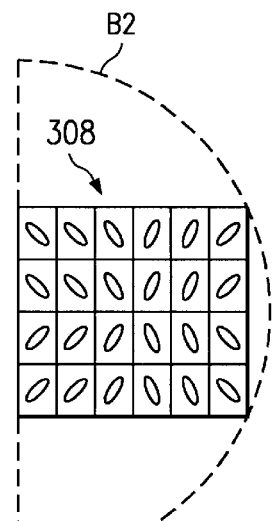
FIG. 5 is a diagram of the aperture's effective illuminating light pass-through area, as shown in FIG. 4, which is enlarged in order to increase the illuminating light utilization to essentially 100%.

In FIG. 4, the semi-circle B2, indicated by dotted lines, represents the aperture's effective area through which the illuminating light passes, while the blocks aligned in a matrix represent the alignment of the lens cells 308a of the second lens array 308. The oval shape in each block indicates the shape of the image of the secondary light source. The light source generally has a long and narrow emission distribution along the optical axis of the reflector 302, and the light source image is formed in a long and narrow configuration in a radial fashion around the optical axis of the reflector 302. Therefore, the secondary light source images on the lens cells 308a of the second lens array 308 have an oval configuration and are radially aligned outward from the center of the array.

Where the projector is designed such that the F-numbers of the illuminating light and the projection light are made essentially the same, so that the loss in light amount is reduced and the optical systems do not become larger than necessary, as shown in FIG. 4, some of the secondary light sources formed by means of the second lens array 308 are located outside the aperture's effective area, and the utilization of the illuminating light is reduced to this extent. However, since the energy density of the secondary light sources is larger at the center than at the periphery, approximately 80% of the total energy can be used even with the construction shown in FIG. 4. If the aperture opening of the projection optical system 5 is increased such that the aperture's effective light pass-through area B2 through which the illuminating light passes completely encompasses the whole second lens array 308, as shown in FIG. 5, the utilization of the illuminating light may be increased to essentially 100%.

The optical image synthesizing unit 4 comprises a prism-type cross-dichroic mirror, which is formed by four rectangular prisms 401, 402, 403 and 404 glued together such that they are angled at a right angle from the adjacent prism. A dichroic multi-layer film, which reflects visible light having a wavelength of approximately 580 nm or longer and lets pass light having a wavelength shorter than 580 nm, is deposited on the glued surfaces 405 and 406, while a dichroic multi-layer film, which reflects light having a wavelength of approximately 510 nm or shorter and lets pass light having a wavelength longer than 510 nm, is deposited on the glued surfaces 407 and 408. The angled surfaces 401a through 403a of the rectangular prisms 401 through 403 are exit surfaces for the illuminating light having the R, G and B color components, respectively, as well as entry surfaces for the R, G and B optical image projection light formed by the light valves 201, 202 and 203. The angled surface 404a of the rectangular prism 404 is an entry surface for the illuminating light that strikes via the rear lens unit 502 of the projection optical system 5, as well as an exit surface for the R, G and B optical image projection light synthesized by the cross-dichroic mirror 4.

Figure 6:
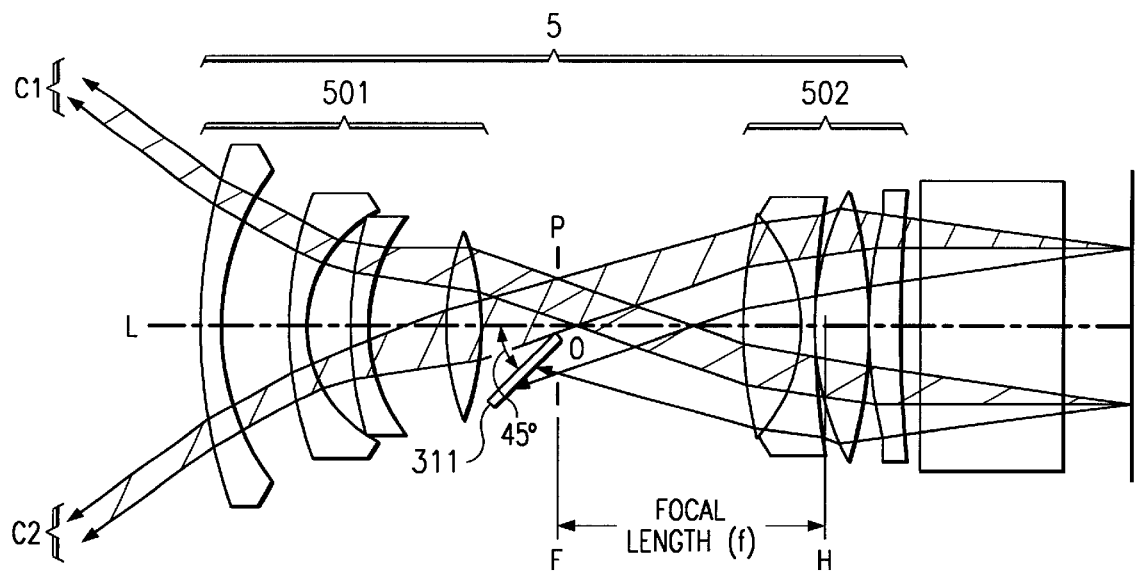
FIG. 6 is a diagram of one example of a location of a total reflection mirror in a projection optical system.

The projection optical system 5 comprises a telecentric projection optical system having two lens units, as shown in FIG. 6, for example. In a telecentric system, the front focal point of the rear lens unit 502 becomes the aperture position P of the projection optical system 5, and therefore, the total reflection mirror 311 is located such that one end matches the intersection point 0 of the optical axis L and the aperture position P of the projection optical system 5, and is tilted toward the front lens unit 501 by 45 degrees relative to the optical axis L. The projection optical system 5 is located such that its relationship with the optical image synthesizing unit 4 is such that (i) the light source images formed at the aperture position P pass through the rear lens unit 502 and cross-dichroic mirror 4, and (ii) after being reflected by the light valves 201, 202 and 203, the reflected light (optical images) form images at the aperture position once more (conjugate relationship).

In the construction of the projection optical system 5 shown in FIG. 6, a space in which to locate the total reflection mirror 311 is needed between the front lens unit 501 and the aperture position P of the projection optical system 5, and therefore the projection optical system 5 increases in length along the optical axis L. Therefore, as shown in FIG. 7, it is acceptable to shorten the projection optical system 5 along the optical axis L by having the total reflection mirror 311 located such that (i) one end matches the intersection point 0 of the optical axis L and the aperture position P of the projection optical system 5, and (ii) it is tilted toward the rear lens unit 502 by 45 degrees relative to the optical axis L.

Figure 7:
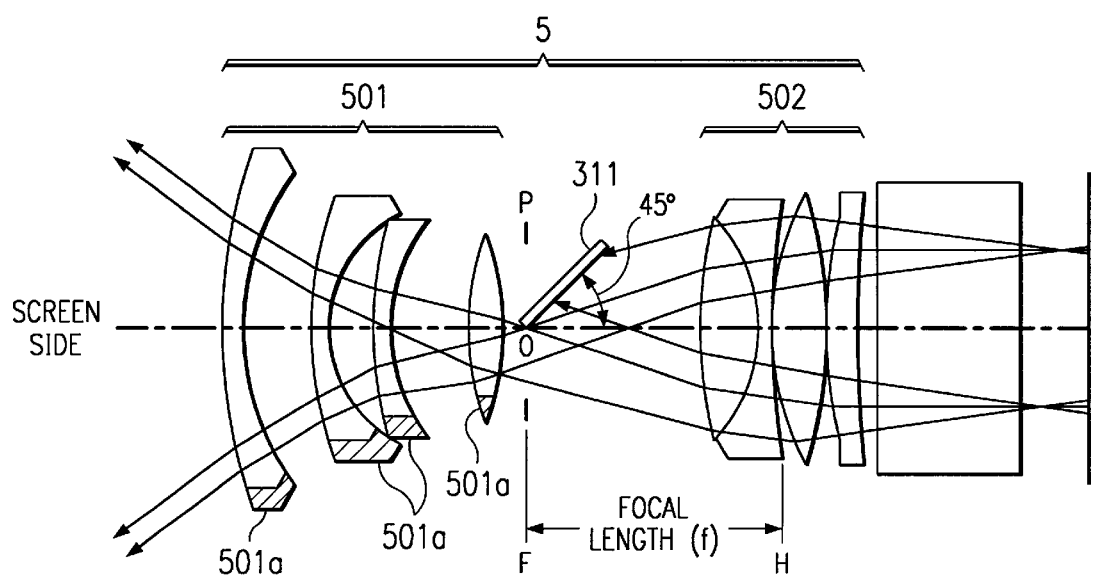
FIG. 7 is a diagram of another example of a location of a total reflection mirror in a projection optical system.

The angle at which the total reflection mirror 311 in FIGS. 6 and 7 is tilted relative to the optical axis L is not limited to 45 degrees. Any angle can be set as long as the projection optical system 5 and the illuminating optical system 3 do not interfere with each other. In addition, in FIG. 7, by increasing the angle of the total reflection mirror 311 relative to the optical axis L above 45 degrees, the vignetting of the illuminating light may be prevented at the aperture position P by means of an aperture plate, etc., not shown in the drawing.

Because it is necessary to have a distance of focal length f between the rear lens unit 502 and the aperture position P of the projection optical system 5 in a telecentric system, the method shown in FIG. 7 can effectively utilize the space between the front lens unit 501 and the rear lens unit 502 as the space at which the total reflection mirror 311 may be located, making it possible to reduce the size of the projection optical system 5. When the total reflection mirror 311 is located on the side of the rear lens unit 502 relative to the aperture position P, the area of the projection light path that passes through to the screen 6 can be made smaller than when the total reflection mirror 311 is located on the side of the front lens unit 501, due to the front lens unit 501 becoming closer to the aperture position P, and therefore, the diameters of the lenses that comprise the front lens unit 501 may be reduced (i.e., the shaded areas 501a in FIG. 7 can be eliminated), which further reduces the size of the projection optical system 5.

In the construction described above, some of the randomly deflected light beams emitted from the light source 301 are irradiated directly through the opening 302a of the reflector 302, and the rest of them are reflected by the reflective surface of the reflector 302 in the direction of the rotational axis of the rotatable paraboloid mirror (the direction of arrow A in FIG. 1), and then irradiated through the opening 302a. The light beams irradiated through the opening 302a of the reflector 302 enter the first lens array 303, are split into multiple light beams by means of the multiple lens cells 303a, and exit toward the polarized separating prism 304. The light beams exiting the lens cells 303a of the first lens array 303 are separated into S polarized light beams and P polarized light beams while they pass through the polarized separating prism 304 and are refracted, and exit the exit surface 305b of the polarized separating prism 304 toward the second lens array 308. The S polarized light beams directly enter the second lens array 308, while the P polarized light beams are converted into S polarized light beams by means of the half-wave plates 307, and then strike the second lens array 308.

The light source 301 and the second lens array 308 are in a conjugate relationship, and the images of the light source 301 are formed on the second lens array 308, and multiple light beams leave the second lens array 308 with these formed light source images as the secondary light sources. The components from the first lens array 303 through the second lens array 308 comprise an optical integrator, and the light source is split into multiple secondary light sources by the second lens array 308. Consequently, illuminating light comprising multiple light beams (S deflected light beams) exits the second lens array 308.

The directions of the optical axes of the multiple light beams exiting the second lens array 308 are changed by the converging lens 309 such that they will irradiate the same surface, and are then led to the aperture position P of the projection optical system 5 by the relay optical system 310 and the total reflection mirror 311, and they form secondary light sources at that position. The illuminating light that formed secondary light source images at the aperture position P of the projection optical system 5 further strikes the rear lens unit 502 of the projection optical system 5 and is released in a telecentric condition to the cross-dichroic mirror 4.

Light beams of the illuminating light that enters the cross-dichroic mirror 4, having a wavelength of approximately 580 nm or longer, are reflected at a right angle by the glued surfaces 405 and 406 toward the red light valve 201, and light beams having a wavelength shorter than 580 nm are allowed to pass through to the green light valve 202. Light beams having a wavelength of approximately 510 nm or shorter are reflected at a right angle by the glued surfaces 407 and 408 toward the blue light valve 203, and light beams having a wavelength longer than approximately 510 nm are allowed to pass through to the green light valve 202. Therefore, illuminating light beams having long wavelengths of approximately 580 nm or longer (essentially red illuminating light) are irradiated toward the red light valve 201 through the polarizer plate 204, illuminating light beams having wavelengths of approximately between 510 nm to 580 nm (essentially green illuminating light) are irradiated toward the green light valve 201 via the polarizer plate 205, and illuminating light beams having short wavelengths of approximately 510 nm or shorter (essentially blue illuminating light) are irradiated toward the blue light valve 203 via the polarizer plate 206. In this way, the electric images are converted into optical images by light valves 201 through 203.

As described above, the components from the first lens array 303 through the second lens array 308 comprise an optical integrator, and because the light beams released from the lens cells 303a of the first lens array 303 are overlaid and irradiated toward light valves 201 through 203 which have a conjugate relationship with the first lens array 303, the light valves 201 through 203 are illuminated with uniform illuminance by means of the illuminating optical system 3.

The R, G and B optical images, which are created by illuminating the panel surfaces of the light valves 201 through 203 with illuminating light having uniform illuminance enter the cross-dichroic mirror 4 and exit toward the projection optical system 5 after color synthesis. In other words, the light beams comprising the R optical image pass through the polarizer plate 204 and then enter the cross-dichroic mirror 4 via the angled surface 401a. They are then reflected by the glued surfaces 405 and 406 toward the angled surface 404a. The light beams comprising the B optical image pass through the polarizer plate 206 and then enter the cross-dichroic mirror 4 via the angled surface 406a. They are then reflected toward the angled surface 404a by the glued surfaces 407 and 407. The light beams comprising the G optical image pass through the polarizer plate 205 and enter the cross-dichroic mirror 4 via the angled surface 405a. They pass through the glued surfaces 405 through 408, without being reflected, toward the angled surface 404a. Therefore, the light beams comprising the R, G and B optical images (S polarized light beams) exit in a commingled fashion from the angled surface 404a of the cross-dichroic mirror 4.

These light beams are formed into images at the aperture position P by means of the rear lens unit 502 of the projection optical system 5, and then are enlarged by the front lens unit 501 of the projection optical system 5 and projected onto the screen 6. In this case, as shown in FIG. 6, since the total reflection mirror 311 is located near the aperture position P such that it blocks off half of the effective light pass-through area of the round aperture, among the light beams comprising the optical images, only those that pass through the area of the aperture that is not shielded (the shaded parts of the light beams C1 and C2 shown in FIG. 6) are enlarged and projected onto the screen 6.

Figure 8:
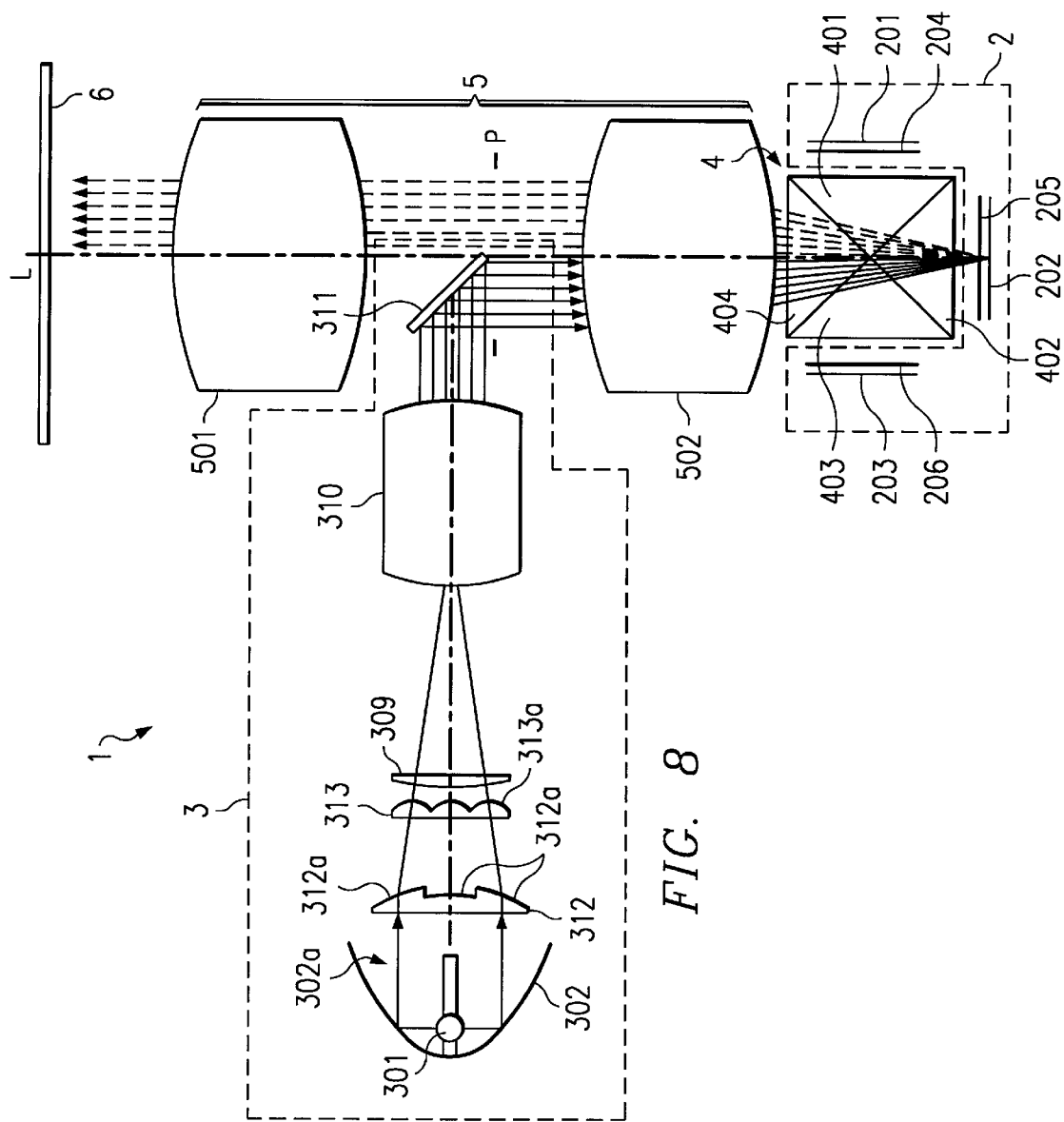
FIG. 8 is a diagram of a second embodiment of optical systems of an image projector of the present invention.

FIG. 8 shows a second embodiment of the optical systems of the image projector pertaining to the present invention.

The image projector 1 shown in the drawing is identical to the device shown in FIG. 1, but the optical integrator comprising the components from the first lens array 303 through the second lens array 308 is replaced with an optical integrator comprising a first lens array 312 and a second lens array 313. It is identical to the first embodiment in that the light source 301 has a conjugate relationship with the second lens array 313, the second lens array 313 has a conjugate relationship with the aperture position P of the projection optical system 5, and the first lens array 312 has a conjugate relationship with the light valves 201 through 203.

Figure 9:
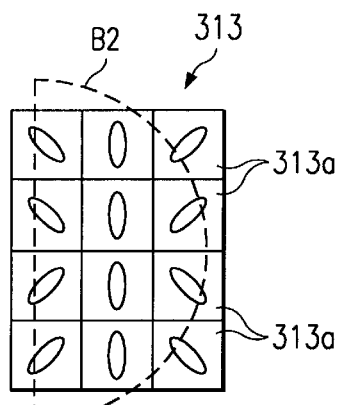
FIG. 9 is a diagram of the relationship between multiple secondary light sources formed by a second lens array which comprises part of an optical integrator of a second embodiment of the present invention and an aperture's effective illuminating light pass-through area.
Figure 10:
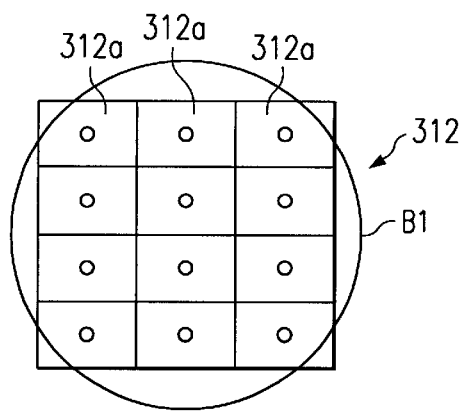
FIG. 10 is a diagram of the positions of optical axes of lens cells of a first lens array which comprises part of an optical integrator of a second embodiment.

The optical integrator of the second embodiment does not increase the number of secondary light sources formed on the second lens array 313 to be double the number of the secondary light sources formed on the first lens array 312 as the optical integrator of the first embodiment, and therefore, the first embodiment is superior to the second embodiment in terms of efficiency in creating illuminating light with uniform illuminance. However, in the second embodiment, as shown in FIG. 9, the secondary light source images, formed on the second lens array 313, are not widely distributed outside the effective illuminating light pass-through area B2 of the aperture, as in the first embodiment. Consequently, as shown in FIG. 10, by having the optical axes of the lens cells 312a on both ends of the first lens array 312 be decentered toward the center of the array so that the secondary light sources formed by the lens cells 312a on both ends come closer to the center of the array, the images of the secondary light sources of the second lens array 317 formed at the aperture position P are distributed within the effective illuminating light pass-through area B2 of the aperture in order to increase the utilization of the illuminating light. Therefore, the second embodiment is superior to the first embodiment in that the utilization of the illuminating light may be easily increased.

The panel surfaces of the light valves 201 through 203 generally have a horizontally long rectangular configuration having a 4:3 or 16:9 aspect ratio. Where the image of the light source 301 is divided into multiple secondary light source images, and uniform illumination is obtained by overlaying these light source images, the distribution of the secondary light source images also assumes a horizontally long rectangular configuration having the aforementioned aspect ratio. However, in a construction in which the total reflection mirror 311 is located near the aperture position of the projection optical system 5, such that half of the light pass-through area of the projection optical system 5 is used for the passage of the illuminating light, because the aperture's effective illuminating light pass-through area B2 assumes a semi-circle configuration, the distribution of the multiple secondary light sources, formed by the optical integrator, need not be of a horizontally long rectangular configuration, corresponding to the panel surfaces of the light valves 201 through 203. Rather, it is superior in terms of efficiency in the use of the illuminating light if the distribution of the multiple secondary light sources, formed by the optical integrator, is made close to a square configuration such that all of the secondary light source images pass through the aperture's effective illuminating light pass-through area B2 to the extent possible.

Therefore, the integrator pertaining to the second embodiment places emphasis on the effective use of the illuminating light. It is also acceptable if the optical axes of the lens cells 312a on both ends of the first lens array 312 are not decentered, but if instead a cylindrical lens is located between the first lens array 312 and the second lens array 313, such that the multiple secondary light source images formed by the first lens array 312 are collected in the center and their distribution is made small.

Figure 11:
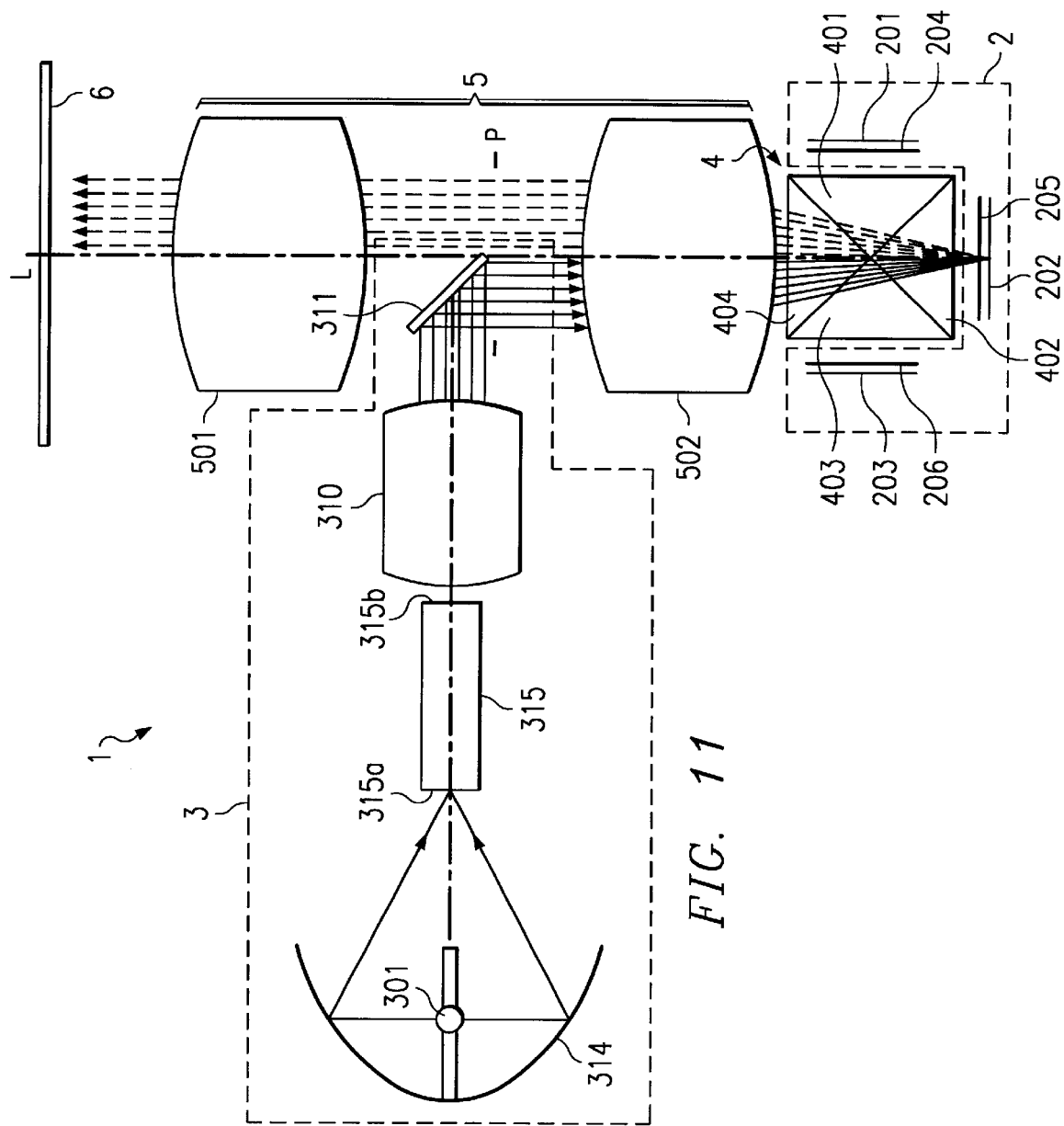
FIG. 11 is a diagram of a third embodiment of the optical systems of the image projector of the present invention.

FIG. 11 shows a third embodiment of the optical systems of the image projector pertaining to the present invention.

The image projector 1 shown in this drawing is identical to the device shown in FIG. 1, but the optical integrator comprising the components from the first lens array 303 through the second lens array 308 and the converging lens 309 is replaced with an optical integrator comprising a kaleidoscope 315 which comprises a square pole or glass cylinder, the entire inner surface of which is reflective. Together with the change of the optical integrator, the reflector 302 is replaced with a reflector 314 comprising an oval mirror having a focal point on the entry surface 315a of the kaleidoscope 315.

The kaleidoscope 315 is located such that (i) its entry surface 315a has a conjugate relationship with the light source 301 and the aperture position P of the projection optical system 5 by means of the optical effect of the reflector 314 and by means of the optical effect of the relay optical system 310, respectively, and (ii) its exit surface 315b has a conjugate relationship with the light valves 201 through 203 by means of the optical effects of the relay optical system 310 and the rear lens unit 502 of the projection optical system 5.

The light beams from the light source 301 and the reflector 314 entering the kaleidoscope 315 repeat their total reflection off the inner surface of the kaleidoscope and exit it via the exit surface 315*b* after being converted into light beams having uniform brightness. Since the exit surface 315*b* of the kaleidoscope 315 is in a conjugate relationship with the light valves 201 through 203, the light beams having uniform brightness are led by the relay optical system 310, the total reflection mirror 311, the rear lens unit 502 of the projection optical system 5 and the cross-dichroic mirror 4 to the light valves 201 through 203 and illuminate them with a uniform illuminance distribution.

The third embodiment has an optical integrator with a simpler construction than that used in the first and second embodiments, and therefore, the optical systems of the image projector 1 may be simplified.

Figure 12:
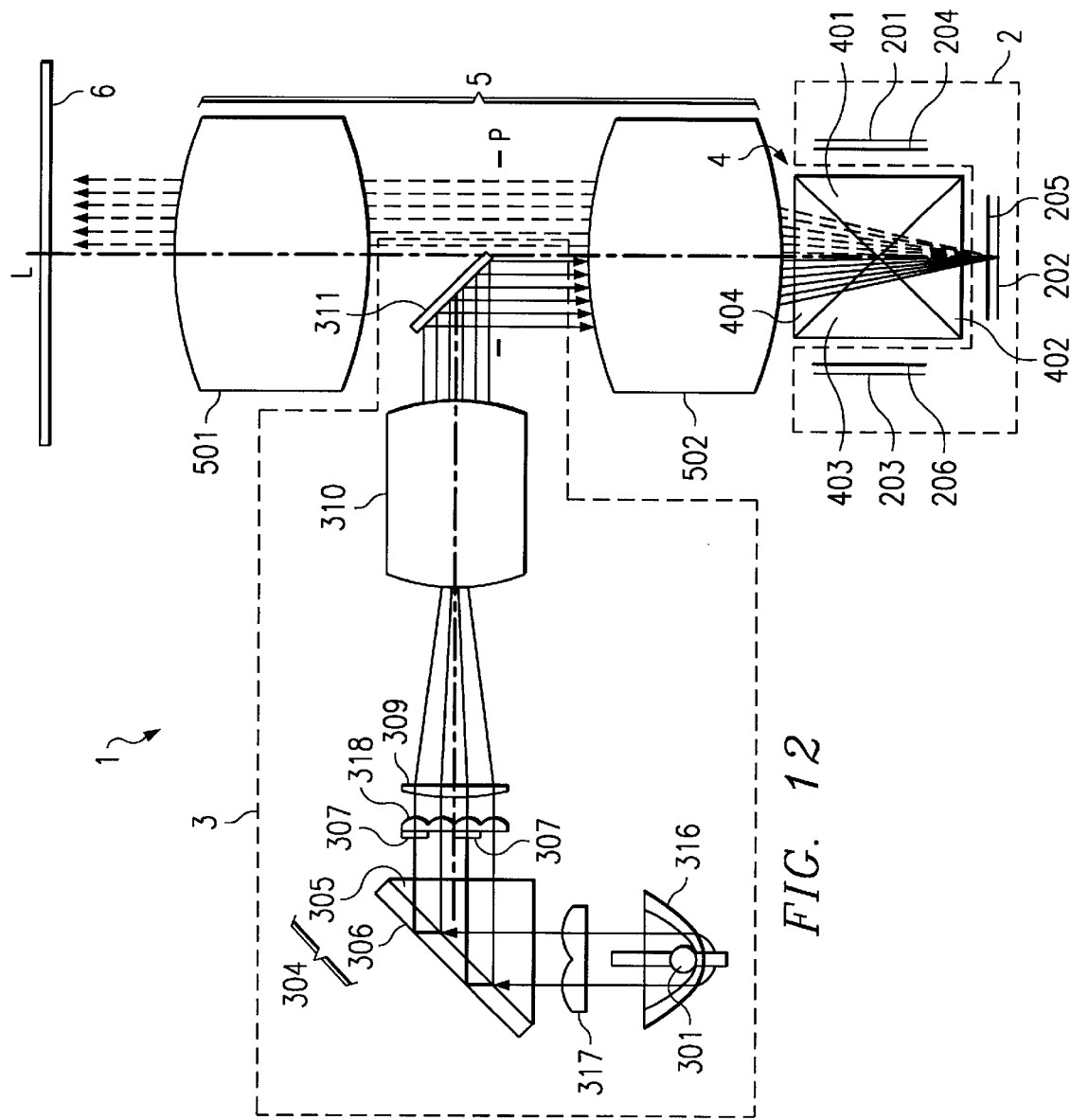
FIG. 12 is a diagram of a fourth embodiment of the optical systems of the image projector of the present invention.

FIG. 12 shows the fourth embodiment of the optical systems of the image projector pertaining to the present invention.

In the fourth embodiment, the reflector and the optical integrator are reduced in size, in consideration of the effective illuminating light pass-through area B2 at the aperture position P. Therefore, the image projector 1, shown in FIG. 12, is identical to the device shown in FIG. 1, except for that (i) the reflector 302 is replaced with a reflector 316 comprising two kinds of paraboloid mirrors having different curvatures, and (ii) the first lens array 303 and the second lens array 308 are replaced with a first lens array 317 and a second lens array 318 which have one fewer lens cell in the horizontal direction. The reflector 316 may be a rotatable oval mirror.

Figure 13:
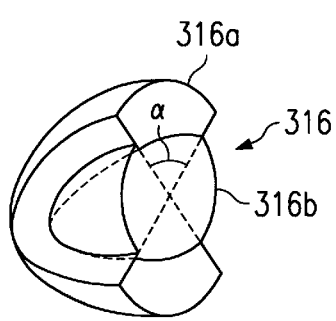
FIG. 13 is a perspective view of a parabloid reflector of the image projector of a fourth embodiment.

The reflector 316 comprises, as shown in FIG. 13, a paraboloid mirror 316*a* having a large curvature, the surface of which is a first rotatable quadric surface, and a paraboloid mirror 316*b* having a small curvature, the surface of which is a second rotatable quadric surface, combined such that their focal points will match, wherein the top and bottom parts corresponding to a certain angle α comprise the paraboloid mirror 316*a*, and the right and left parts corresponding to the remaining angle (π–α) comprise the paraboloid mirror 316*b*. As is clear from FIG. 4, among the 4×6 secondary light sources formed by the second lens array 308, only 4×3 secondary light sources, which comprise about half of the original number in the horizontal direction, form images in the aperture's effective illuminating light pass-through area B2, and therefore, the light beams from the light source 301, irradiated by means of the reflector 316, are horizontally smaller than when the reflector 302 is used. As a result, the horizontal length of the first lens array 317 is shorter than that of the first lens array 303 by one lens cell 303*a*, and the horizontal length of the second lens array 318 is shorter than that of the second lens array 308 by two lens cells 308*a*.

The opening 316*a* of the reflector 316 has a configuration similar to that of a Japanese drum because fan-shaped areas having a large radius are located at the top and bottom and fan shaped areas having a small radius are located at the right and left such that they are symmetrical across a line, as described above. This opening 316 and the alignment of the lens cells 317*a* of the first lens array 317 have the relationship shown in FIG. 14. The light beams irradiated via the opening 316*a* of the reflector 316 are split into 4×2 light beams and create secondary light sources on the optical axes of the lens cells 317*a* (indicated by black dots). These secondary light sources are further split into 4×4 secondary light sources on the second lens array 218 and form images at the aperture position P as shown in FIG. 15. Therefore, the illuminating light is effectively used.

Therefore, in the fourth embodiment, the illuminating optical system 3 may be reduced in size without reducing the utilization of the illuminating light, and as a result, the image projector 1 may be made small and lightweight and the cost may be reduced.

It is also acceptable if the light source member comprising the light source 301 and the reflector 316 pertaining to the fourth embodiment are applied in the image projector pertaining to the second embodiment.

Figure 16:
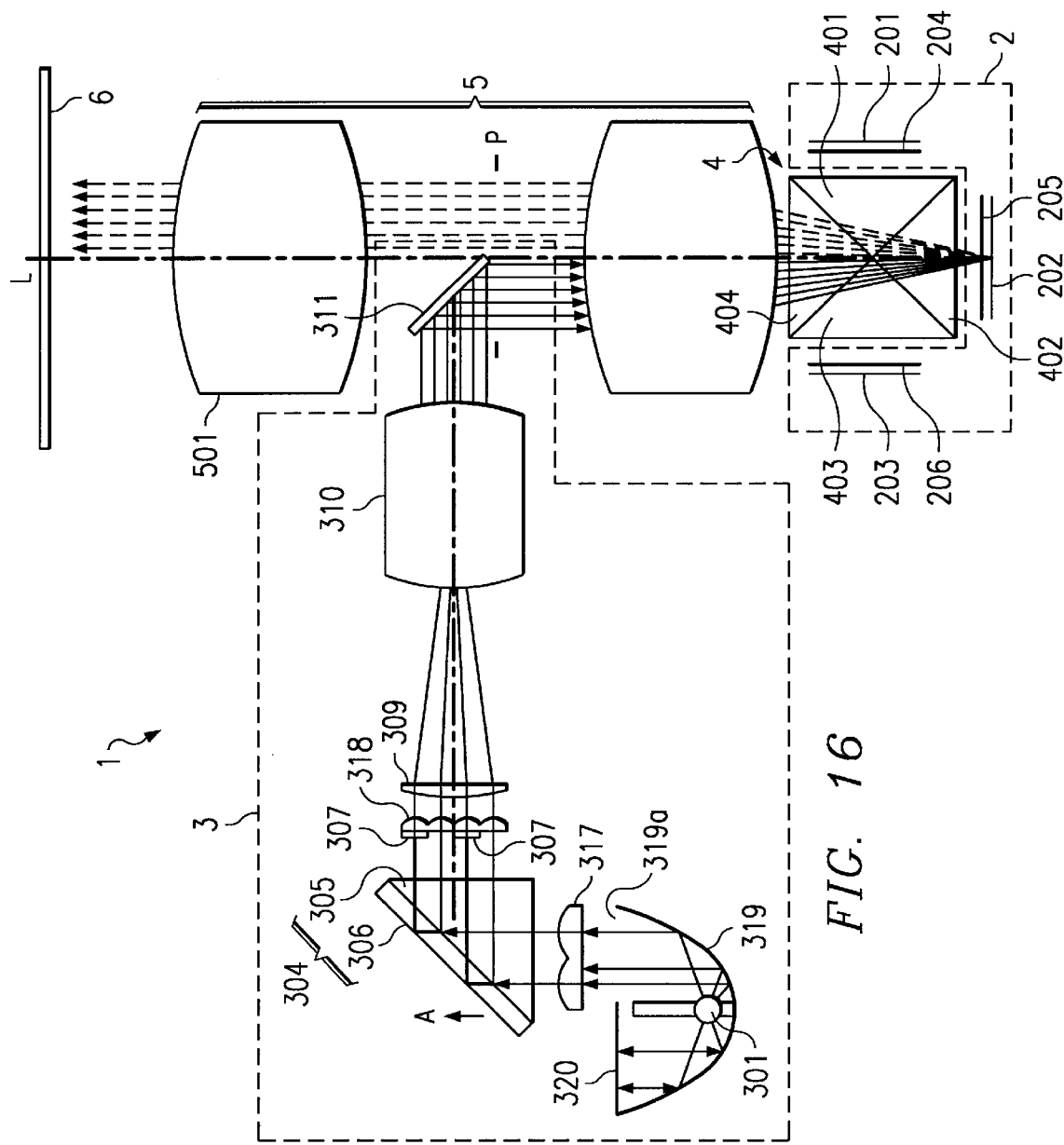
FIG. 16 is a diagram of the fifth embodiment of optical systems of an image projector of the present invention.

FIG. 16 shows a fifth embodiment of the optical systems of the image projector pertaining to the present invention.

The fifth embodiment is identical to the fourth embodiment except that the light source member comprising a light source and a reflector is improved. In other words, the image projector 1, shown in the drawing, is the device shown in FIG. 12, except that the light source member is replaced with a light source member comprising a reflector 319 consisting of a paraboloid mirror, the left half of the opening of which is covered by a semi-circular flat mirror 320, and a light source 301 located at the focal point of said reflector 319. The reflector 319 may comprise a rotatable oval mirror or a rotatable hyperbolic paraboloid mirror. In these cases, however, the flat mirror 320 must be replaced by a concave- or convex-shaped spherical mirror that accommodates the oval or hyperbolic paraboloid mirror.

The light beams irradiated from the light source 301 are reflected in the direction (the direction of arrow A in FIG. 16) along the axis by the paraboloid mirror. The light beams reflected by the right half of the paraboloid mirror are directly released through the opening 319*a* and strike the first lens array 317. On the other hand, the light beams reflected by the left half of the paraboloid mirror are reflected back by the flat mirror 320 to the points of the paraboloid mirror at which they were originally reflected, and are reflected at said points such that they will pass the focal point of the paraboloid mirror. They are then reflected by the right half of the paraboloid mirror toward the opening 319*a*. Therefore, the light beams, irradiated by the light source 301, are converted by the reflector 319 and the flat mirror 320 into light beams parallel to the axis of the paraboloid mirror by the right half of the paraboloid mirror, and are then released.

Figure 17:
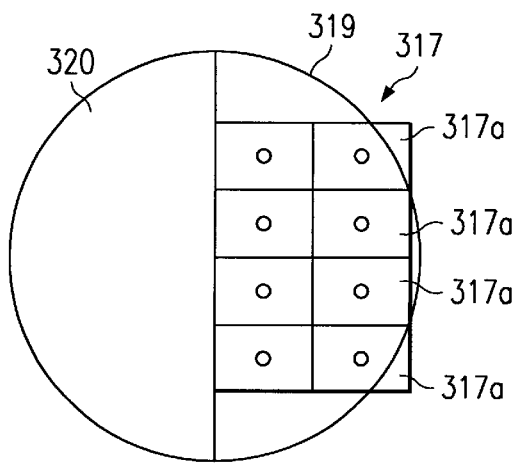
FIG. 17 is a diagram of the relationship between the configuration of an opening of a reflector of an image projector of a fifth embodiment and an alignment of lens cells of a first lens array.

The configuration of the opening 319*a* of the reflector 319 and the arrangement of the lens cells 317*a* of the first lens array 317 have the relationship shown in FIG. 17. The light beams irradiated via the opening 319*a* of the reflector 319 are split into 4×2 light beams in the same manner as in the fourth embodiment, and create secondary light sources on the optical axes of the lens cells 317*a* (indicated by black dots in FIG. 14).

Figure 14:
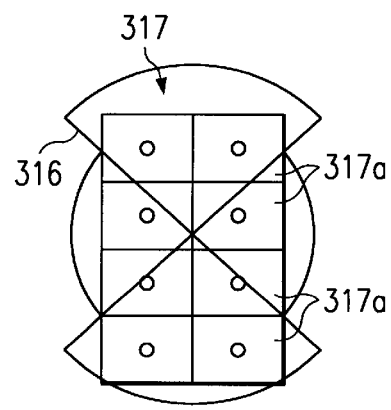
FIG. 14 is a diagram of the configuration of an opening of a reflector of the image projector of a fourth embodiment and an alignment of lens cells of a first lens array.
Figure 15:
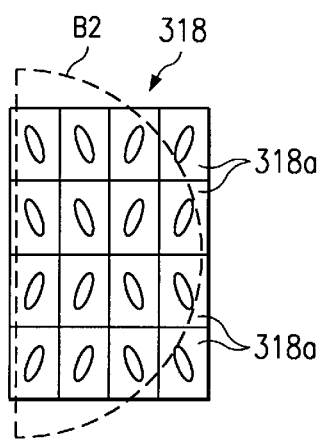
FIG. 15 is a diagram of the relationship between multiple secondary light sources formed by a second lens array which comprises part of an optical integrator of a fourth embodiment and the aperture's effective illuminating light pass-through area.

As is clear by comparing FIG. 14 and FIG. 17, the light beams that strike the first lens array 317 in the illuminating optical system 3 pertaining to the fifth embodiment and the illuminating optical system 3 pertaining to the fourth embodiment have different configurations, but the utilization of the illuminating light from the light source 301 of the former optical system is essentially identical to that pertaining to the fourth embodiment.

In the fifth embodiment, the light source member is slightly larger to the extent that the curvature of the reflector 319 increases in comparison with the fourth embodiment, but as in the fourth embodiment, the illuminating optical system 3 may be reduced in size without reducing the utilization of the illuminating light in comparison with the first and second embodiments. The light source member comprising the light source 301 and the reflector 319 pertaining to the fifth embodiment may be applied in the image projector pertaining to the second embodiment.

As described above, because an optical integrator is used in the illuminating optical system 3 in the reflective image projector, the light valves 201 through 203 may be illuminated with uniform illuminance distribution where there is little unevenness in illuminance and brightness.

In addition, because the images of the illuminating light and the projection light are formed at the position P of the projection optical system 5 aperture, which has a small effective diameter, and the paths of these lights are separated, the optical systems of the image projector 1, in which there is little loss in the amount of light, may be constructed in a compact manner. Further, because the separation of the illuminating light and the synthesis of the projection light are performed by means of a cross-dichroic mirror 4, the optical systems of the image projector 1 may be made further compact.

Moreover, because the light source images are formed at the aperture position P of the projection optical system 5, which is perpendicular to the optical axis, flat lens arrays, which are easy to manufacture, may be used for the first and second lens arrays 303 and 308, which helps reduce the cost of components.

Furthermore, because polarizer plates 204 through 206 are located directly in front of the light valves 201 through 203, respectively, the reduction in contrast caused by changes in the polarization characteristics due to photoelastic strain of the optical components may be prevented, and the loss in the amount of light and the occurrence of stray light due to the reflection characteristics of the cross-dichroic mirror 4 may be reduced.

INDUSTRIAL APPLICABILITY

As explained above, the present invention is a reflective image projector having a projection optical system between the light valves and the screen and a light source means that irradiates illuminating light in a direction perpendicular to the optical axis of the projection optical system, wherein the illuminating light is made to pass through half of the aperture area by means of a reflecting member located at the aperture position of the projection optical system in order to illuminate the light valves, and wherein an optical integrator is located between the light source means and the reflecting member that forms multiple secondary light sources by splitting the light beams from the light source means and forms the secondary light sources into images at the aperture position of the projection optical system. This design offers a compact construction in which uniform illuminance distribution on the light valve panel surfaces and a projected image with little unevenness in brightness may be obtained.

In particular, the optical integrator comprises a first lens array and a second lens array, and the optical axes of at least some of the lens cells comprising the first lens array are decentered toward the center of the array. Consequently, an optical integrator which achieves a high utilization of the illuminating light may be constructed using a simple optical system.

In addition, the light source means comprises (i) a reflective mirror, a part of the reflective surface of which comprises a first rotatable quadric surface and the remainder of which comprises a second rotatable quadric surface that has the same focal point as the first rotatable quadric surface but a different focal length, and (ii) a light source located at the focal point of this reflective mirror. Consequently, the utilization of the illuminating light may be further increased.

In addition, the light source means comprises (i) a reflective mirror comprising (a) a paraboloid mirror and (b) a flat mirror located such that it covers half of the opening of the paraboloid mirror, and that directly reflects back the light reflected from the paraboloid mirror back to the original reflection points on the paraboloid mirror, and (ii) a light source located at the focal point of this reflective mirror. Consequently, where a light source means emitting the same amount of light is used, the optical system comprising the optical integrator may be made smaller, allowing the size of the image projector to be reduced.

Moreover, the reflecting member is located on the light valve side relative to the aperture position of the projection optical system. Consequently, the projection optical system may be made short along its optical axis and the diameters of the lenses may be reduced, enabling the projection optical system to be made compact.

Although the present invention has been described with reference to a presently preferred embodiment, it will be appreciated by those skilled in the art that various modifications, alternatives, variations, etc., may be made without departing from the spirit and scope of the invention as defined in the appended claims.

What is claimed is:

1. An image projector comprising:

light source means for generating illuminating light;

a light valve for spatially modulating the illuminating light and for forming an optical image for projection;

a projection optical system for projecting optical images onto a screen, said projection optical system having an aperture;

a reflecting member, located at said aperture of said projection optical system, for reflecting the illuminating light from the light source means; and an optical integrator, located between the light source means and the reflecting member, for splitting the illuminating light from the light source means and for forming multiple secondary light source images at the aperture of the projection optical system, wherein the illuminating light from the light source means is reflected by said reflecting member such that the illuminating light strikes the light valve after passing through a first half of an effective light pass through area of the aperture, and said optical image for projection is passed through a second half of the effective light pass through area of the aperture.

2. An image projector, as claimed in claim 1, further comprising:

a prism-type cross-dichroic mirror for separating said multiple secondary light source images into a plurality of light components corresponding to red, green, and blue; and a plurality of light valves for spatially modulating said plurality of light components.

3. An image projector, as claimed in claim 1, wherein said optical integrator comprises:

a first lens array comprising a plurality of lens cells; and a second lens array comprising a plurality of lens cells, wherein at least some of said plurality of lens cells of said first lens array are decentered so as to be closer to a center of the first lens array.

4. An image projector, as claimed in claim 1, wherein said optical integrator further comprises a plurality of half wave plates for converting P polarized light beams into S polarized light beams.

5. An image projector, as claimed in claim 1, wherein said optical integrator comprises a first lens array and a second lens array, and wherein said light source means comprises a reflector and a light source, said reflector comprising a first mirror and a second mirror, said first mirror comprising a first rotatable quadric surface and said second mirror comprising a second rotatable quadric surface, said first rotatable quadric surface and said second rotatable quadric surface having a common focal point but having different focal lengths, wherein said light source is located at said focal point of said first and said second rotatable quadric surfaces.

6. An image projector, as claimed in claim 1, wherein said optical integrator comprises a first lens array and a second lens array, and wherein said light source means comprises a reflective mirror and a light source, said reflective mirror comprising a parabolic mirror and a flat mirror, said flat mirror being disposed so as to cover approximately half of an opening of said parabolic mirror for reflecting light which was previously reflected from an original reflection point on said parabolic mirror back to said original reflection point on said parabolic mirror, wherein said light source is located at a focal point of said parabolic mirror.

7. An image projector comprising:

light source means for generating illuminating light;

a projection optical system for projecting optical images onto a screen, said projection optical system having an aperture;

a reflecting member, for reflecting the illuminating light from the light source means; and an optical integrator, located between the light source means and the reflecting member, for splitting the illuminating light from the light source means and for forming multiple secondary light source images at the aperture of the projection optical system;

a prism-type cross-dichroic mirror for separating said multiple secondary light source images into a plurality of light components corresponding to red, green, and blue; and a plurality of light valves for spatially modulating said plurality of light components and for forming an optical image for projection;

wherein said reflecting member is disposed between said aperture of said projection optical system and said plurality of light valves, and wherein the illuminating light from the light source means is reflected by said reflecting member such that the illuminating light strikes the plurality of light valves after passing through a first half of an effective light pass through area of the aperture and said optical image for projection is passed through a second half of the effective light pass through area of the aperture.

8. An image projector, as claimed in claim 7, wherein said multiple secondary light source images comprise a plurality of S polarized light beams and a plurality of P polarized light beams.

9. An image projector, comprising:

a light source;

a light valve for spatially modulating illuminating light from the light source and for forming an optical image for projection;

a projection optical system for projecting the optical image onto a screen, said projection optical system having an aperture;

a reflecting member, located at a position of the aperture of the projection optical system, for reflecting the illuminating light from the light source; and an optical integrator, located between the light source and the reflecting member, for splitting the illuminating light from the light source and for forming multiple secondary light source images at the aperture of the projection optical system.

10. An image projector, comprising:

a light source;

a light valve for spatially modulating illuminating light from the light source and for forming an optical image for projection;

a projection optical system for projecting the optical image onto a screen, said projection optical system having a front lens unit, a rear lens unit, and an aperture provided between said front lens unit and said rear lens unit;

a reflecting member, located at a position of the aperture of the projection optical system, for reflecting the illuminating light from the light source; and an optical integrator, located between the light source and the reflecting member, for splitting the illuminating light from the light source and for forming multiple secondary light source images at the aperture of the projection optical system.

11. An image projector, comprising:

a light source;

a light valve for spatially modulating illuminating light from the light source and for forming an optical image for projection;

a projection optical system for projecting the optical image onto a screen, said projection optical system having an aperture;

a reflecting member, located at a position of the aperture of the projection optical system, for reflecting the illuminating light from the light source; and an optical integrator, located between the light source and the reflecting member, for splitting the illuminating light from the light source and for forming multiple secondary light source images at the aperture of the projection optical system, wherein the position of said aperture is different than a position of an entrance pupil of said projection optical system.

* * * * *